(12) United States Patent
Holzapfel et al.

(10) Patent No.: US 9,188,424 B2
(45) Date of Patent: Nov. 17, 2015

(54) INTERFEROMETER

(71) Applicant: DR. JOHANNES HEIDENHAIN GMBH, Traunreut (DE)

(72) Inventors: Wolfgang Holzapfel, Obing (DE); Joerg Drescher, Samerberg (DE); Markus Meissner, Uebersee (DE); Ralph Joerger, Traunstein (DE); Bernhard Musch, Traunreut (DE); Erwin Spanner, Traunstein (DE); Thomas Kaelberer, Schrobenhausen (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 57 days.

(21) Appl. No.: 14/135,000

(22) Filed: Dec. 19, 2013

(65) Prior Publication Data

US 2014/0176962 A1    Jun. 26, 2014

(30) Foreign Application Priority Data

Dec. 20, 2012 (DE) .......................... 10 2012 223 887
Jan. 31, 2013 (DE) .......................... 10 2013 201 611

(51) Int. Cl.
*G01B 9/02* (2006.01)

(52) U.S. Cl.
CPC ........ *G01B 9/02059* (2013.01); *G01B 9/02018* (2013.01)

(58) Field of Classification Search
CPC ...... G01B 9/02; G01J 9/02; G01J 2009/0261; G01J 4/04; G01N 21/45
USPC ......................................................... 356/491
See application file for complete search history.

(56) References Cited

U.S. PATENT DOCUMENTS 4,979,826 A    12/1990   Ishizuka et al.
5,563,706 A  * 10/1996   Shibuya et al. ............... 356/495
(Continued)

FOREIGN PATENT DOCUMENTS

DE    39 23 768    3/1990
DE    40 28 051    3/1992
(Continued)

OTHER PUBLICATIONS

European Search Report, dated Mar. 19, 2014, issued in corresponding European Patent Application No. 13195461.2.

*Primary Examiner* — Tarifur Chowdhury
*Assistant Examiner* — Md Rahman
(74) *Attorney, Agent, or Firm* — Kenyon & Kenyon LLP

(57) ABSTRACT

An interferometer includes a light source and a beam splitter, via which the beam of rays emitted by the light source is split into a measurement beam and a reference beam. The measurement beam propagates in a measuring arm extending in a first direction between the beam splitter and a measuring reflector. The measuring reflector brings about an offset perpendicular to the direction of incidence between the measurement beam falling on it and the measurement beam reflected back by it. In a reference arm extending in a second direction, the reference beam propagates between the beam splitter and a reference reflector. In addition, the interferometer has a detector system, to which the superposed and recombined measurement beam and reference beam are able to be supplied, and via which a distance-dependent interference signal with respect to the position of the measuring reflector is able to be generated. The measuring reflector in each case includes at least one transmission grating as well as a reflector element.

25 Claims, 5 Drawing Sheets

(56) References Cited

U.S. PATENT DOCUMENTS

| | | |
|---|---|---|
| 6,020,964 A | 2/2000 | Loopstra et al. |
| 6,208,424 B1 | 3/2001 | de Groot |
| 2002/0001087 A1* | 1/2002 | Hill .............................. 356/510 |
| 2006/0098205 A1* | 5/2006 | Townley-Smith et al. .... 356/487 |

2013/0194584 A1    8/2013    Holzapfel et al.

FOREIGN PATENT DOCUMENTS

| | | |
|---|---|---|
| DE | 10 2008 043 540 | 5/2010 |
| DE | 10 2012 201 393 | 8/2013 |

* cited by examiner

INTERFEROMETER

CROSS-REFERENCE TO RELATED APPLICATIONS

The present application claims priority to Application No. 10 2012 223 887.5, filed in the Federal Republic of Germany on Dec. 20, 2012, and to Application No. 10 2013 201 611.5, filed in the Federal Republic of Germany on Jan. 31, 2013, each of which is expressly incorporated herein in its entirety by reference thereto.

The present application also claims the benefit of U.S. Provisional Patent Application No. 61/739,883, filed on Dec. 20, 2012, which is expressly incorporated herein in its entirety by reference thereto.

FIELD OF THE INVENTION

The present invention relates to an interferometer.

BACKGROUND INFORMATION

U.S. Pat. No. 6,208,424, for example, describes an interferometer having a light source that emits a beam of rays in the direction of a beam splitter. The beam splitter splits the beam of rays into a measurement beam and a reference beam. The measurement beam then propagates in a measuring arm extending in a first direction between the beam splitter and a measuring reflector. The measuring reflector brings about an offset perpendicular to the direction of incidence between the measurement beam falling on it and the measurement beam reflected back by it. The reference beam propagates in a reference arm extending in a second direction between the beam splitter and a reference reflector, the second direction being oriented perpendicularly to the first direction. In addition, a detector system is provided, to which the superposed and recombined measurement beam and reference beam are able to be supplied, and via which a distance-dependent interference signal with respect to the position of the measuring reflector is able to be generated.

Because of the construction selected for the measuring reflector and the offset produced by it between the beams falling on the measuring reflector and reflected back by it, periodic signal errors otherwise occurring are able to be minimized. Such periodic signal errors may be caused, for example, by non-perfect polarization-optical elements, or else by other optical elements in the paths of the measurement and reference beams.

The measuring reflector described in U.S. Pat. No. 6,208,424 includes two plane mirrors, oriented perpendicularly relative to each other, which bring about the above-mentioned spatial offset of the beams reflected back by them relative to the beams falling on them. Moreover, although it is mentioned that the measuring reflector could also be constructed differently, details concerning an alternative form are not provided.

When working with a form of the measuring reflector having two plane mirrors oriented perpendicularly relative to each other, problems result in the case of a displacement of the measuring reflector along a direction which is oriented orthogonally relative to the measuring direction. In this context, measuring direction is understood to be the direction along which the measuring reflector is movably disposed. In U.S. Pat. No. 6,208,424, x denotes the measuring direction and z denotes the mentioned direction orthogonal to it. For further clarification of these problems, reference is made to FIGS. 1a and 1b. On the left, FIG. 1a shows measuring reflector MR, including two plane mirrors, which is disposed on a machine part MT, and whose position along measuring direction x is to be determined with the aid of the interferometer. FIG. 1a also shows the measurement beam falling twice on measuring reflector MR, the measurement beam falling for the first time being denoted by reference numeral 1, the measurement beam reflected back by measuring reflector MR the first time being denoted by reference numeral 2, the measurement beam falling on measuring reflector MR for the second time being denoted by reference numeral 3, and the measurement beam reflected back by measuring reflector MR the second time being denoted by reference numeral 4. Between the first and second incidence of the measurement beam on measuring reflector MR, the measurement beam impinges on a retroreflector. The right part of FIG. 1a is a top view of measuring reflector MR and the spatial configuration of individual measurement beams 1 to 4, i.e., the resulting rectangular beam cross-section pattern—hereinafter referred to as a spot pattern—in the yz-plane. S denotes the mirror axis of measuring reflector MR oriented along the y-direction, and I denotes the inversion center of the retroreflector. In the case of the provided position of measuring reflector MR along the z-direction, inversion center I is located on mirror axis S of measuring reflector MR.

FIG. 1b shows the conditions when measuring reflector MR, i.e., machine part MT, is displaced upward along the z-direction compared to the position in FIG. 1a. For example, this may be caused by inaccurate guidance. As illustrated in the right part of FIG. 1b, inversion center I of the retroreflector is no longer located on mirror axis S of measuring reflector MR, with the result that before and after the second incidence on measuring reflector MR, measurement beams 3, 4 have a greater distance to mirror axis S than in the case of the first incidence on measuring reflector MR. The result is the spot pattern shown in the right part of FIG. 1b, which is no longer rectangular.

According to the illustrations included in FIGS. 1a and 1b, the resulting spot pattern, that is, the spatial configuration of the measurement beams in the measuring arm in the case of the interferometer described in U.S. Pat. No. 6,208,424, is therefore not invariant with respect to a shift of the measuring reflector in the z-direction, i.e., with respect to a shift along a direction deviating from the measuring direction. The consequence of a spot pattern changing in this manner is that an overall larger construction volume is necessary for the interferometer or the interferometer optical system. The measuring reflector must be dimensioned such that even if it is shifted, the measurement beams all fall on it. Moreover, because of the spot pattern changing in this manner, relatively large beam diameters must be selected in order to ensure a sufficient overlap between the measurement beam and reference beam when they are recombined. Otherwise, the degree of modulation of the distance-dependent interference signals would be too low. Another result of the shift in the measurement beams explained is that they subsequently pass through or impinge on other areas and boundary surfaces of downstream optical components. Unevenness of these components then causes errors in the position measurement.

SUMMARY

Example embodiments of the present invention provide an interferometer with which, besides minimization of cyclic signal errors, it is also ensured that the resulting spot pattern at least in the measuring arm is as invariant as possible with respect to displacements of the measuring reflector along axes which do not coincide with the measuring direction.

According to example embodiments of the present invention, an interferometer includes a light source and a beam splitter which splits the beam of rays emitted by the light source into a measurement beam and a reference beam. The measurement beam propagates in a measuring arm extending in a first direction between the beam splitter and a measuring reflector, the measuring reflector bringing about an offset perpendicular to the direction of incidence between the measurement beam falling on it and the measurement beam reflected back by it. In a reference arm extending in a second direction, the reference beam propagates between the beam splitter and a reference reflector. A detector system, which is able to be supplied with the superposed and recombined measurement beam and reference beam, is able to generate a distance-dependent interference signal with regard to the position of the measuring reflector. The measuring reflector in each instance includes at least one transmission grating as well as a reflector element.

The measuring reflector may be constructed and disposed such that the measurement beam incoming toward it along the first direction initially impinges on the transmission grating at a first point of impact and undergoes a first deflection in a first offset plane, is then reflected back again at the reflector element in the direction of the transmission grating and impinges on the transmission grating at a second point of impact, where the measurement beam undergoes a second deflection in the first offset plane and then propagates along the second direction in parallel misalignment relative to the direction of incidence, in the direction of the beam splitter.

In this context, the first offset plane may be defined by the first direction and the second direction.

It is further possible that the reference reflector in each case includes at least one transmission grating as well as a reflector element.

In this context, the reference reflector may be constructed and disposed such that the reference beam incoming toward it along the second direction initially impinges on the transmission grating at a first point of impact and undergoes a first deflection in a second offset plane, the second offset plane being oriented perpendicularly to the first offset plane, and such that the reference beam is then reflected back again at the reflector element in the direction of the transmission grating and impinges on the transmission grating at a second point of impact, where the reference beam undergoes a second deflection in the second offset plane and then propagates along a third direction in parallel misalignment relative to the direction of incidence, in the direction of the beam splitter.

It may be provided that the second offset plane is defined by the second direction and the third direction, the third direction being oriented perpendicularly to the first and second directions.

It is further possible for the reflector element to take the form of a plane mirror.

Alternatively, the reflector element may also be in the form of a reflection grating.

A polarization-optical element may be disposed in the path of the measurement beam reflected back by the measuring reflector.

Furthermore, a polarization-optical element may be disposed in the path of the reference beam reflected back by the reference reflector.

In this context, the polarization-optical element may take the form of a linear polarizer or a combination of a linear polarizer and a lambda/2 plate.

In addition, it is possible that the first direction and the second direction are oriented perpendicularly relative to each other.

The measurement beam and reference beam reflected back for the first time by the measuring reflector and the reference reflector, after passing through the beam splitter, may in each case strike a retroreflector, via which the measurement beam and reference beam, respectively, undergo a spatially offset reflection back in the direction of the beam-splitter element, pass through it, and then impinge on the measuring reflector and the reference reflector a second time before the measurement beam and reference beam reflected back by them come to interfering superposition at the detector system.

The arrangements described herein may ensure, first of all, that periodic signal errors are sufficiently minimized. In addition, the selected form of the measuring reflector may ensure that even if it is displaced along an axis which does not coincide with the measuring direction, the resulting spot pattern in the measuring arm remains unchanged. Consequently, the entire optical system of the interferometer may be smaller, and errors resulting in the position measurement because of beam displacements may be avoided.

In addition, a desired spot pattern may be flexibly adjusted via the construction of the measuring reflector. Because space is usually limited in such applications, this represents a further important advantage compared to conventional arrangements, such as those described above, having a spot pattern not alterable in defined fashion.

It should also be mentioned that a costly arrangement of mirrors in a 90° configuration, such as that described in U.S. Pat. No. 6,208,424, is no longer necessary on the part of the measuring reflector. Such a mirror arrangement requires high expenditure for alignment during assembly. In addition, such a construction of the measuring reflector results in markedly increased weight on the part of the moving machine part. In contrast, the arrangements described herein require no such alignment expenditure. In addition, the measuring reflector is considerably lighter, and therefore the mass moved with the machine part is substantially smaller.

As a further advantage of the construction of the measuring reflector described herein, it should be mentioned that via it, a beam offset may be implemented in both directions perpendicular to the measuring direction. This is not possible, for instance, in the case of a measuring reflector in the form of a roof prism. In this manner, variable spot patterns are able to be produced, e.g., 4 spots in a row, etc. This, in turn, is sometimes important in order to be able to take restrictions possibly existing due to the specific machine design into account.

The reference reflector may also be constructed analogously to the measuring reflector. However, this is not a necessity.

In addition, the arrangements described herein may be used not only in interferometers having measuring arms and reference arms oriented perpendicularly relative to each other, but also in alternative layout variations, e.g., in the case of measuring and reference arms oriented in parallel.

Further features and aspects of example embodiments of the present invention are described in more detail below with reference to the appended Figures.

DETAILED DESCRIPTION

Figure 2A:
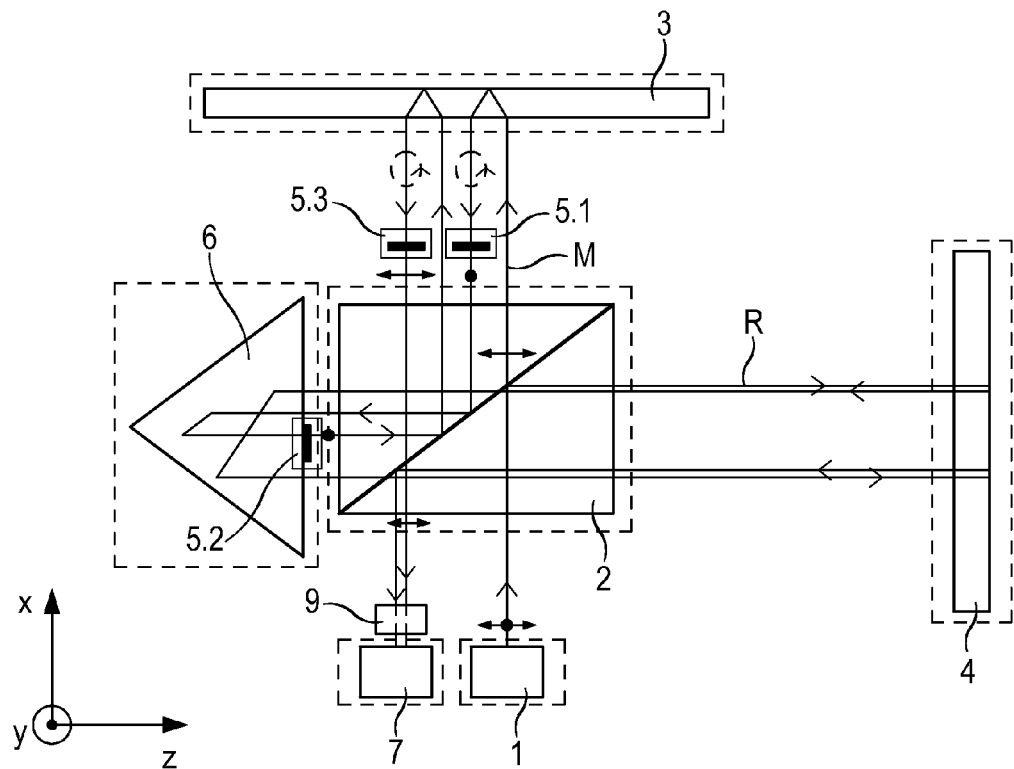
FIG. 2a is a first view of the beam path in an interferometer according to an example embodiment of the present invention
Figure 2B:
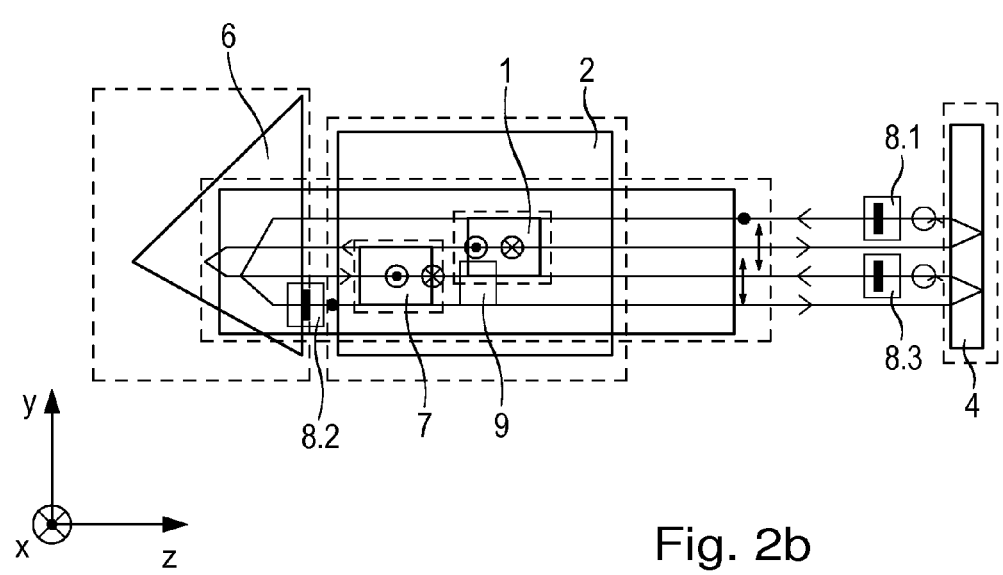
FIG. 2b is a second view of the beam path in an interferometer according to an example embodiment of the present invention.
Figure 2C:
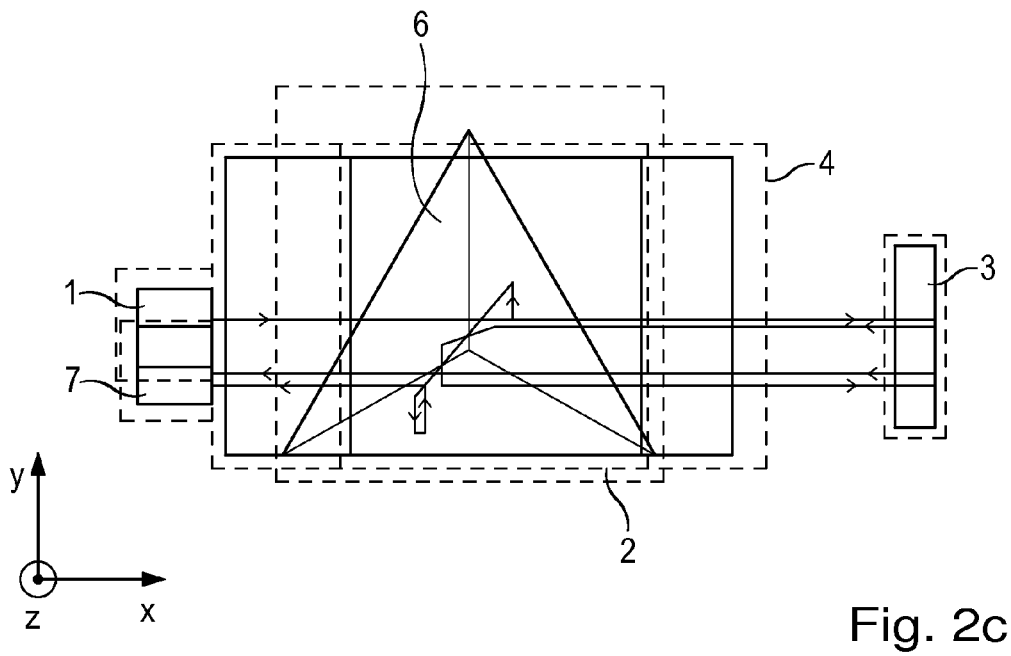
FIG. 2c is a third view of the beam path in an interferometer according to an example embodiment of the present invention.

An interferometer according to an exemplary embodiment of the present invention is explained with reference to FIGS. 2a to 2c. These figures show various views of the beam path used for the signal generation. It is pointed out that for reasons of better clarity, not all components of the interferometer are illustrated in all views. Thus, certain polarization-optical elements 5.1 to 5.3 are illustrated only in FIG. 2a, for example, and other polarization-optical elements 8.1 to 8.3 are illustrated only in FIG. 2b. These polarization-optical elements 5.1 to 5.3, 8.1 to 8.3 are omitted completely in FIG. 2c. Likewise for reasons of clarity, the various polarization states of measuring beam M are shown only in FIG. 2a, the polarization states of reference beam R only in FIG. 2b, while they are omitted in FIG. 2c.

The interferometer includes a light source 1 which emits a linearly polarized beam of rays in the direction of a beam splitter 2. Preferably, a coherent laser light source is used as the light source 1. A polarization-optical beam-splitter cube is provided as beam splitter 2 in the illustrated example. Beam splitter 2 splits the beam of rays falling on it into a p-polarized measurement beam M and an s-polarized reference beam R. In FIGS. 2a and 2b, the polarization states in the various beams are denoted consistently as follows:
- • denotes s-polarization;
- ↕ denotes p-polarization; and
- ↻ denotes elliptical polarization.

In the following, first of all, the path of the measurement beam between the splitting at beam splitter 2 and the recombination with reference beam R at detector system 7 is explained. Initially, measurement beam M propagates undeviated in a measuring arm extending in a first direction x between beam splitter 2 and a measuring reflector 3. Measuring reflector 3 is disposed in a manner allowing movement along first direction x relative to the remaining interferometer components. The distance to measuring reflector 3 is determined via the interferometer. Therefore, in the exemplary embodiment shown, direction x corresponds to the measuring direction.

For example, measuring reflector 3 may be disposed in a machine on a machine part movable along the x direction, whose position is to be determined extremely accurately. The interference signals generated by the interferometer may be used by a machine control device for positioning the machine part.

At measuring reflector 3, measurement beam M falling on it for the first time, upon being reflected back in the direction of beam splitter 2, then undergoes an offset perpendicular to the direction of incidence in a first offset plane xz which is defined by the two directions x and z. For the construction of measuring reflector 3, reference is made to the subsequent description of FIGS. 3a to 5. For the time being, the further path of measurement beam M will be clarified in the following. As indicated in FIG. 2a, measurement beam M reflected for the first time by measuring reflector 3 has an elliptical polarization after the reflection. After passing through a polarization-optical element 5.1, which includes a linear polarizer and a lambda/2 plate, measurement beam M is s-polarized and is reflected by beam splitter 2 in the direction of a retroreflector 6. In the exemplary embodiment illustrated, retroreflector 6 is in the form of a corner reflector or triple-corner mirror and reflects measurement beam M back in the direction of beam splitter 2. Situated between retroreflector 6 and beam splitter 2 is a further polarization-optical element 5.2 in the form of a linear polarizer. Measurement beam M undergoes an s-polarization via this polarization-optical element 5.2, and is then reflected by beam splitter 2 in the direction of measuring reflector 3. Analogous to the first reflection of measurement beam M taking place at measuring reflector 3, a second reflection of measurement beam M takes place in the direction of beam splitter 2, in the process, an offset perpendicular to the direction of incidence in first offset plane xz again being brought about via measuring reflector 3 between measurement beam M now falling on it a second time and measurement beam M reflected back by it to beam splitter 2, offset plane xz being defined by the two directions x and z.

After the second reflection at measuring reflector 3, the measurement beam passes through a further polarization-optical element 5.3, which includes a linear polarizer and a lambda/2 plate, and via it, undergoes a p-polarization. Measurement beam M polarized in this manner is transmitted, undeviated, by the beam splitter in the direction of a downstream detector system 7.

In the following, the path of reference beam R is explained. The s-polarized reference beam R is reflected at beam splitter 2 into a reference arm, extending in a second direction z, which stretches between beam splitter 2 and a reference reflector 4. In the exemplary embodiment illustrated, second direction z is oriented perpendicularly to first direction x. However, such a placement of the reference arm relative to the measuring arm is not absolutely necessary. For example, a parallel placement of the measuring arm and reference arm is also possible as an alternative.

Reference beam R then arrives a first time at a fixedly disposed reference reflector 4. In the present exemplary embodiment, reference reflector 4 is identical to measuring reflector 3 and reflects reference beam R falling on it, back in the direction of beam splitter 2, and in the process, reference beam R undergoing an offset in a second offset plane yz. As illustrated in FIG. 2b, the second offset plane is defined by third direction y and second direction z. As illustrated in FIGS. 2a to 2c, third direction y is perpendicular to the two other directions x and z.

With regard to the specific construction of the reference reflector, reference is made to the subsequent explanation of FIGS. 3a to 5. It should further be pointed out that it is not absolutely necessary for reference reflector 4 to be identical to measuring reflector 3. Alternative arrangements of the reference reflector are also possible, e.g., as what is termed a cat's eye in diffractive construction or in the form of two reflectors in a 90° configuration, etc.

Reference beam R, reflected back by reference reflector 4 and having elliptical polarization, subsequently passes through a polarization-optical element 8.1, which includes a linear polarizer and a lambda/2 plate, and in the process, is converted into a linearly p-polarized beam. Reference beam R polarized in this manner then passes, undeviated, through beam splitter 2 in the direction of retroreflector 6, and is reflected back by it in the direction of beam splitter 2. Between retroreflector 6 and beam splitter 2, reference beam R undergoes a p-polarization via polarization-optical element 8.2 in the form of a linear polarizer, so that it passes once more through beam splitter 2 and propagates again in the direction of reference reflector 4. There, a second reflection takes place back in the direction of beam splitter 2, analogous to the first reflection, namely, with an offset of reference beam R in the y direction in second offset plane yz. After being reflected back at reference reflector 4, reference beam R traverses a further polarization-optical element 8.3, which includes a linear polarizer and a lambda/2 plate, via which it is converted to an s-polarized state, and is then deviated by beam splitter 2 in the direction of detector system 7 for the interfering superposition with measurement beam M.

Thus, after leaving beam splitter 2 the last time, p-polarized measurement beam M and s-polarized reference beam R propagate, superposed with each other, in the direction of detector system 7. Prior to reaching detector system 7, the two superposed beams M, R traverse a further polarization-optical element 9, e.g., a λ/4 plate, via which p-polarized and s-polarized beams M, R are converted into beams polarized circularly opposite to each other. In detector system 7, the superposed beams are split into three sub-beams, which then in each case pass through a polarizer before they strike optoelectronic detector elements, at which three phase-shifted, distance-dependent interference signals result. They may then be further processed, e.g., in conventional manner, as a measure for the position of measuring reflector 3 along measuring direction x.

Via the form provided for measuring reflector 3, in each instance an offset is brought about in the interferometer between measurement beam M falling on measuring reflector 3 and measurement beam M reflected back by it. In this connection, an offset results perpendicular to the direction of incidence, e.g., in a first offset plane xz which, in the exemplary embodiment described, is defined by first direction x, e.g., measuring direction x and second direction z. Because of this spatial separation of measurement beam M falling on measuring reflector 3 and measurement beam M reflected back by it, the desired polarization states are able to be set in defined fashion. To that end, polarization-optical elements 5.1 and 5.3, respectively, are disposed in the path of measurement beam M reflected back, and in this manner, the requisite polarization state of measurement beam M propagating in the direction of beam splitter 2 is set in controlled fashion in each case. Mispolarizations of measurement beam M possibly resulting at measuring reflector 3 may thus be eliminated or filtered out. In addition, the resulting offset ensures that certain multiple traversals of the beams, which are caused by mispolarizations possibly remaining, proceed in a manner spatially offset relative to the beams which contribute to the generation of the position-dependent interference signals. In this manner, the mispolarized beams do not reach detector system 7.

Analogously, this may also be accomplished by the use of a correspondingly constructed reference reflector 4 in the reference arm for reference beam R. In this case, resulting second offset plane yz for reflected reference beam R is perpendicular to first offset plane xz in the measuring arm.

Figure 4:
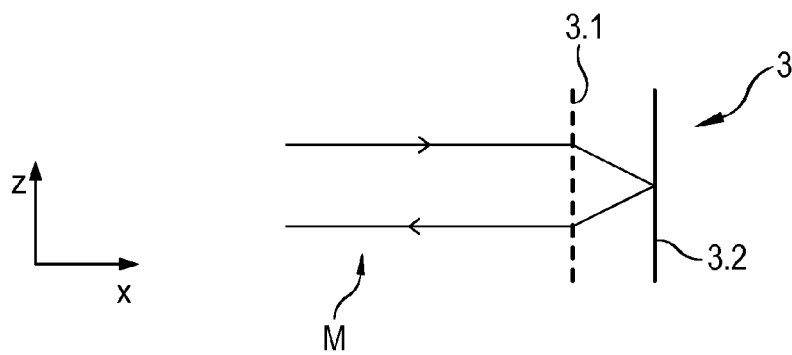
FIG. 4 illustrates a measuring reflector in an interferometer according to an example embodiment of the present invention.

A variant of such a measuring reflector 3, as may be used, for instance, in the exemplary embodiment of the interferometer, is schematically illustrated in FIG. 4. Measuring reflector 3 includes at least one transmission grating 3.1, e.g., a suitable phase grating, as well as a reflector element 3.2, which in the present example is in the form of a plane mirror and whose reflecting surface is oriented in the direction of transmission grating 3.1.

As illustrated in FIG. 4, measurement beam M incoming along measuring direction x initially impinges on transmission grating 3.1 at a first point of impact. There, via a resulting diffraction at transmission grating 3.1, it is deflected in first offset plane xz, which is defined by first direction x and second direction z. At reflector element 3.2, measurement beam M is reflected back again in the direction of transmission grating 3.1 and impinges on it at a second point of impact. There, under diffraction, it undergoes a further deflection in first offset plane xz and subsequently propagates in parallel misalignment relative to incident measuring beam M back in the direction of the beam splitter.

Figure 5:
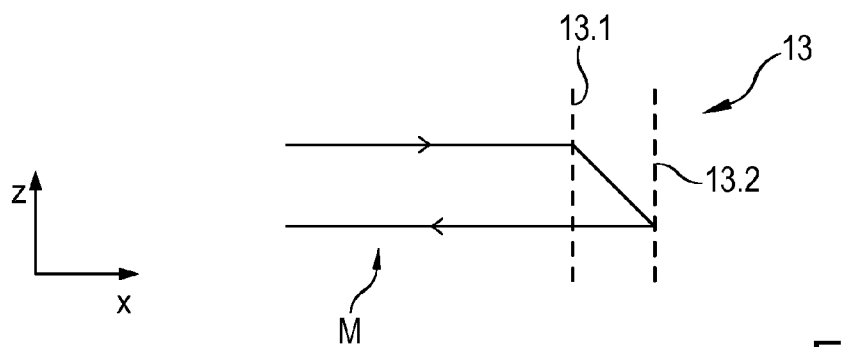
FIG. 5 illustrates a measuring reflector in an interferometer according to an example embodiment of the present invention.

A suitable measuring reflector 13 alternative to this is schematically illustrated in FIG. 5. It again includes a transmission grating 13.1. However, at this point, reflector element 13.2 is not in the form of a plane mirror, but rather a reflection grating. As illustrated in FIG. 5, via it, a deflection effect in the first offset plane results at the first point of impact of measurement beam M incoming from the left. Measurement beam M is reflected back by the suitably dimensioned reflection grating perpendicularly to the second point of impact on transmission grating 13.1, which is then traversed by measurement beam M without further resulting deflection effect. This measuring-reflector variant also brings about the desired parallel misalignment in the offset plane between the measurement beam falling on measuring reflector 13 and the measurement beam emerging from it, and permits the selective placement of polarization-optical elements in the respective beam paths already explained above.

In addition to the two example embodiments illustrated, further alternative variants of measuring reflectors may also be used, in which, for example, more than two resulting diffractions and/or reflections of the measurement beam are provided, etc.

As mentioned above, the reference reflector in the interferometer may also be constructed in a manner corresponding to such variants of the measuring reflector.

Figure 1A:
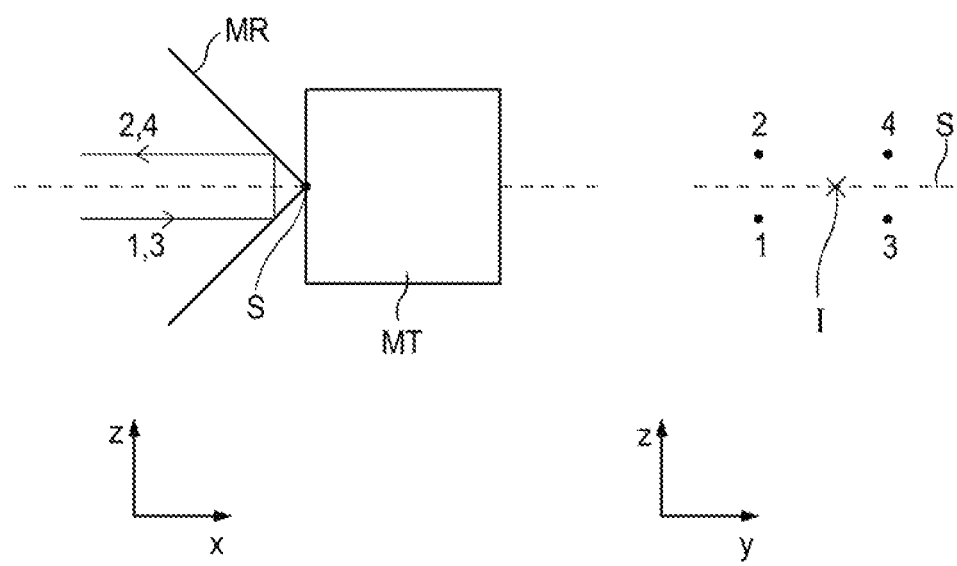
FIGS. 1a and 1b are illustrative for explaining prior art arrangements.
Figure 1B:
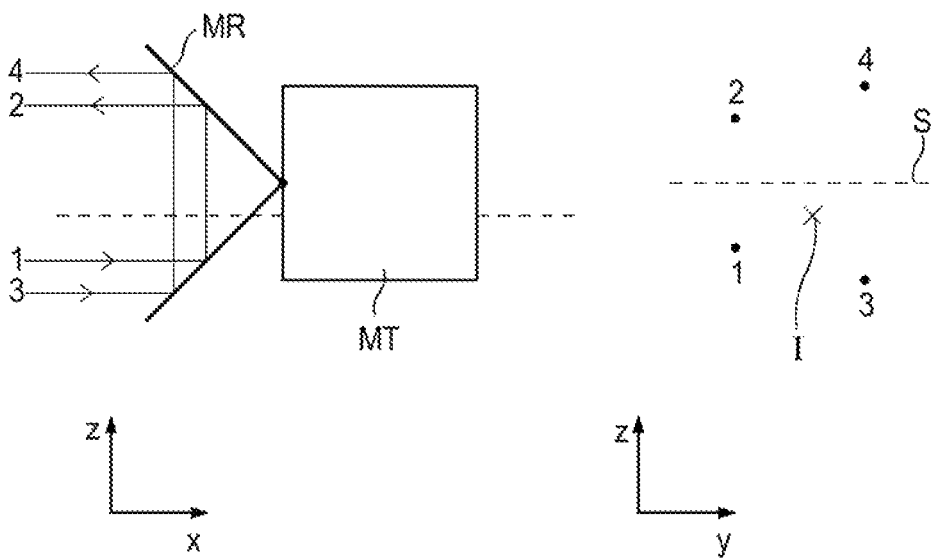

In the following, referring to FIGS. 3*a* and 3*b*—comparable to the illustrations included in FIGS. 1*a* and 1*b*—it is explained how an invariant spot pattern is able to be produced on the measuring reflector via the measures described herein, even if the measuring reflector moves along a direction y which deviates from actual measuring direction x. Because of the different placement of the measuring arm and reference arm compared to the conventional system, the deviation direction is not direction z, but rather direction y. However, as in conventional systems, it is a direction which is oriented orthogonally relative to measuring direction x.

Figure 3A:
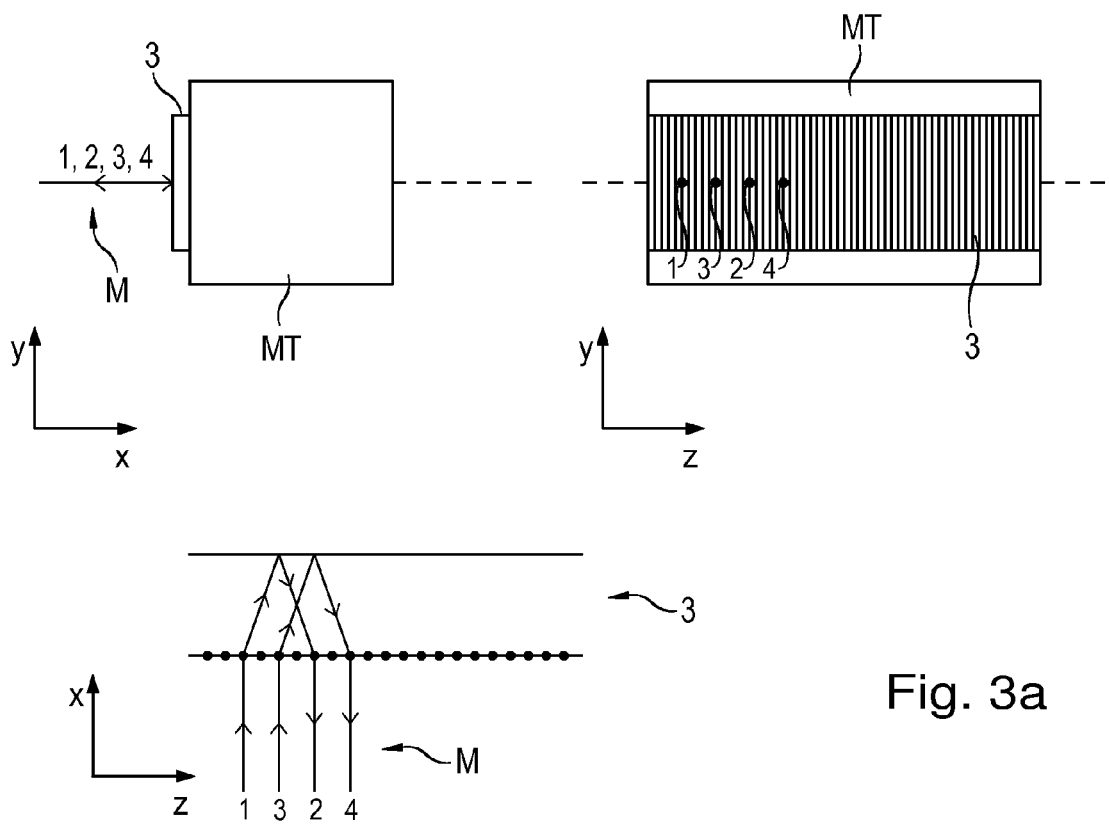
FIGS. 3a and 3b illustrate resulting spot patterns in the measuring arm of the interferometer in the case of different positions of the measuring reflector along the z-axis.

Thus, FIG. 3*a* illustrates the state in which the machine part, movable along measuring direction x and having measuring reflector 3, is located along the y direction in the setpoint position. The linear spot pattern shown to the right in FIG. 3*a* results. Analogous to FIG. 1*a*, the individual measurement beams are provided with reference numerals 1 to 4 in FIG. 3*a*, as well. The lower part of FIG. 3*a* shows a top view of measuring reflector 3 in this position, including the path of measurement beam M in first offset plane xz.

Figure 3B:
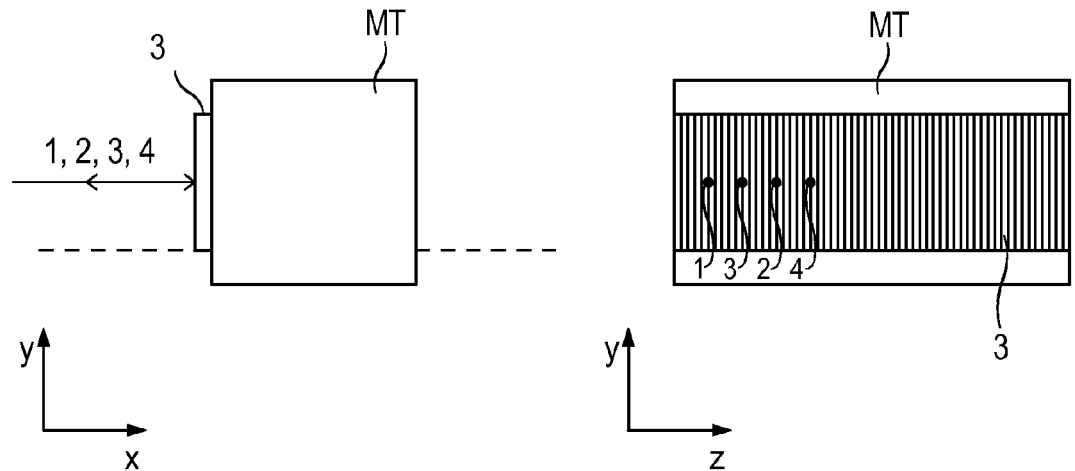

FIG. 3*b* illustrates the state in which machine part MT has been shifted along third direction y. As apparent from the right part of FIG. 3*b*, a linear spot pattern again results, which has not changed compared to the desired state in FIG. 3*a*. Accordingly, the invariant spot pattern striven for is present on measuring reflector 3.

Figure 6A:
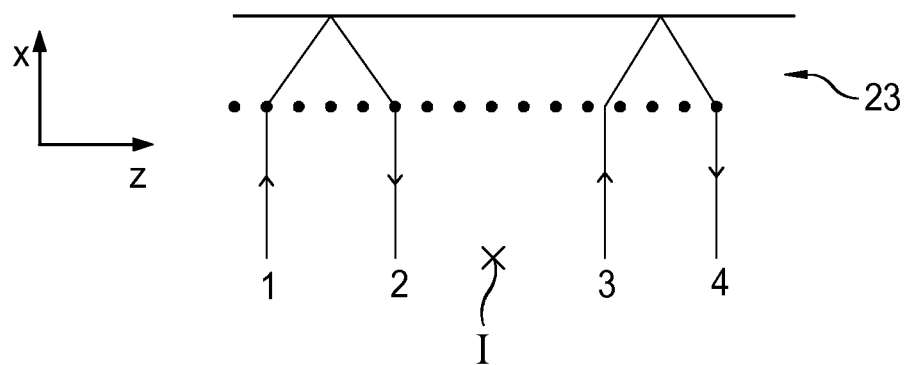
FIGS. 6a and 6b illustrate further possibilities for obtaining defined spot patterns using the interferometer according to example embodiments of the present invention.
Figure 6B:
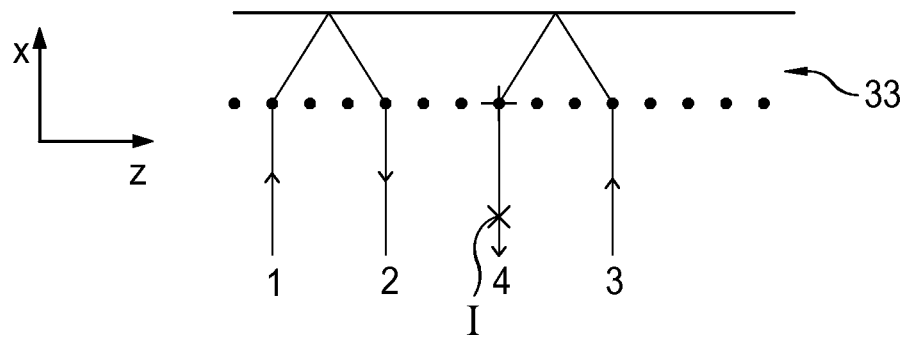

Referring to FIGS. 6a and 6B, it is also illustrated that via the particular construction of measuring reflector 23, 33 and/or its positioning relative to the retroreflector, it is possible to produce not just the spot pattern shown at the bottom in FIG. 3a, having the four incoming and emerging measurement beams in the configuration shown. In FIGS. 6a, 6b, only inversion center I is indicated on the part of the retroreflector used, in order to signify that in these two cases, in each instance different relative positions of measuring reflector 23, 33 and the retroreflector are provided. Therefore, the alternative spot patterns shown in FIGS. 6a and 6b may also be obtained with different configurations of the individual measurement beams in the interferometer.

What is claimed is:

1. An interferometer, comprising
a light source adapted to emit a beam of rays;
a beam splitter adapted to split the beam of rays emitted by the light source into a measurement beam and a reference beam;
a measuring arm extending in a first direction, in which the measurement beam propagates between the beam splitter and a measuring reflector, the measuring reflector adapted to bring about an offset perpendicular to a direction of incidence between the measurement beam that impinges on the measuring reflector and the measurement beam that is reflected back by the measuring reflector;
a reference arm extending in a second direction, in which the reference beam propagates between the beam splitter and a reference reflector; and
a detector system, to which superposed and recombined measurement beam and reference beam are suppliable, and adapted to generate a distance-dependent interference signal with respect to a position of the measuring reflector;
wherein the measuring reflector includes at least one transmission grating and reflector element.

2. The interferometer according to claim 1, wherein the reference reflector includes at least one transmission grating and reflector element.

3. The interferometer according to claim 2, wherein the reflector element includes a plane mirror.

4. The interferometer according to claim 2, wherein the reflector element includes a reflection grating.

5. The interferometer according to claim 2, further comprising a polarization-optical element arranged in a path of the reference beam reflected back by the reference reflector.

6. The interferometer according to claim 5, wherein the polarization-optical element includes a linear polarizer.

7. The interferometer according to claim 6, wherein the polarization-optical element includes a lambda/2 plate.

8. The interferometer according to claim 1, wherein the reflector element includes a plane mirror.

9. The interferometer according to claim 1, wherein the reflector element includes a reflection grating.

10. The interferometer according to claim 1, further comprising a polarization-optical element arranged in a path of the measurement beam reflected back by the measuring reflector.

11. The interferometer according to claim 10, wherein the polarization-optical element includes a linear polarizer.

12. The interferometer according to claim 11, wherein the polarization-optical element includes a lambda/2 plate.

13. The interferometer according to claim 1, wherein the first direction and the second direction are perpendicular to each other.

14. An interferometer, comprising:
a light source adapted to emit a beam of rays;
a beam splitter adapted to split the beam of rays emitted by the light source into a measurement beam and a reference beam;
a measuring arm extending in a first direction, in which the measurement beam propagates between the beam splitter and a measuring reflector, the measuring reflector adapted to bring about an offset perpendicular to a direction of incidence between the measurement beam that impinges on the measuring reflector and the measurement beam that is reflected back by the measuring reflector;
a reference arm extending in a second direction, in which the reference beam propagates between the beam splitter and a reference reflector; and
a detector system, to which superposed and recombined measurement beam and reference beam are suppliable, and adapted to generate a distance-dependent interference signal with respect to a position of the measuring reflector;
wherein the measuring reflector includes at least one transmission grating and reflector element; and
wherein the measuring reflector is constructed and arranged such that the measurement beam, incoming along a first direction, initially impinges on the transmission grating at a first point of impact and undergoes a first deflection in a first offset plane, is then reflected back again at the reflector element in the direction of the transmission grating and impinges on the transmission grating at a second point of impact, where the measurement beam undergoes a second deflection in the first offset plane, and then propagates parallel relative to the direction of incidence back to the beam splitter, with an offset along a second direction.

15. The interferometer according to claim 14, wherein the first offset plane is defined by the first direction and the second direction.

16. The interferometer according to claim 14, wherein the reference reflector includes at least one transmission grating and reflector element, and wherein the reference reflector is constructed and arranged such that: (a) the reference beam, incoming along the second direction, initially impinges on the transmission grating at a first point of impact and undergoes a first deflection in a second offset plane, the second offset plane being oriented perpendicularly to the first offset plane; and (b) the reference beam is then reflected back again at the reflector element in the direction of the transmission grating and impinges on the transmission grating at a second point of impact, where the reference beam undergoes a second deflection in the second offset plane, and then propagates parallel relative to the direction of incidence back to the beam splitter, with an offset along a third direction.

17. The interferometer according to claim 16, wherein the second offset plane is defined by the second direction and the third direction, the third direction oriented perpendicularly to the first direction and to the second direction.

18. An interferometer, comprising:
a light source adapted to emit a beam of rays;
a beam splitter adapted to split the beam of rays emitted by the light source into a measurement beam and a reference beam;
a measuring arm extending in a first direction, in which the measurement beam propagates between the beam splitter and a measuring reflector, the measuring reflector adapted to bring about an offset perpendicular to a direction of incidence between the measurement beam that impinges on the measuring reflector and the measurement beam that is reflected back by the measuring reflector;
a reference arm extending in a second direction, in which the reference beam propagates between the beam splitter and a reference reflector; and
a detector system, to which superposed and recombined measurement beam and reference beam are suppliable, and adapted to generate a distance-dependent interference signal with respect to a position of the measuring reflector;
wherein the measuring reflector includes at least one transmission grating and reflector element; and
wherein the measurement beam and reference beam reflected back for a first time by the measuring reflector and the reference reflector, after passing through the beam splitter, in each case strike a retroreflector, by which the measurement beam and reference beam each undergo a spatially offset reflection back in the direction of the beam-splitter element, pass through the beam-splitter element, and then impinge on the measuring reflector and the reference reflector a second time, before the measurement beam and reference beam reflected back by the measuring reflector and the reference reflector come to interfering superposition at the detector system.

19. The interferometer according to claim 18, wherein the reference reflector includes at least one transmission grating and reflector element.

20. The interferometer according to claim 18, wherein the reflector element includes a plane mirror.

21. The interferometer according to claim 18, wherein the reflector element includes a reflection grating.

22. The interferometer according to claim 18, further comprising a polarization-optical element arranged in a path of the measurement beam reflected back by the measuring reflector.

23. The interferometer according to claim 22, wherein the polarization-optical element includes a linear polarizer.

24. The interferometer according to claim 23, wherein the polarization-optical element includes a lambda/2 plate.

25. The interferometer according to claim 18, wherein the first direction and the second direction are perpendicular to each other.

* * * * *